US000001403H

United States Statutory Invention Registration [19]

[11] Reg. Number: H1403

George

[43] Published: Jan. 3, 1995

[54] POLYKETONE POLYMER BLENDS

[75] Inventor: Eric R. George, Houston, Tex.

[73] Assignee: Shell Oil Company, Houston, Tex.

[21] Appl. No.: 525,813

[22] Filed: May 21, 1990

[51] Int. Cl.[6] ..... C08G 63/48; C08F 283/00

[52] U.S. Cl. ..... 525/64; 525/74; 525/185; 525/539

[58] Field of Search ..... 525/64, 74, 185, 539

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 3,919,354 | 11/1975 | Moore et al. | 525/255 |
| 4,197,376 | 4/1980 | Lee et al. | 525/74 |
| 4,305,869 | 12/1981 | Lee et al. | 260/45.95 R |
| 4,562,229 | 12/1985 | Walker et al. | 525/74 |
| 4,783,494 | 11/1988 | Allen | 524/139 |
| 4,814,378 | 3/1989 | Lutz | 525/55 |
| 4,843,144 | 6/1989 | Van Broekhoven et al. | 528/392 |
| 4,870,133 | 9/1989 | Lutz et al. | 525/539 |
| 4,874,819 | 10/1989 | George et al. | 525/185 |
| 4,880,903 | 11/1989 | Van Broekhoven et al. | 528/392 |
| 4,900,789 | 2/1990 | Gergen | 525/185 |

FOREIGN PATENT DOCUMENTS 1081304 of 1967 United Kingdom .

*Primary Examiner*—Shean Wu

[57] ABSTRACT

Improved compositions comprise polymer blends of a linear alternating polymer of carbon monoxide and at least one ethylenically unsaturated hydrocarbon and a polyblend with a rubber modifier incorporated therein, and optionally, an acidic polymer containing moieties of an $\alpha$-olefin and an $\alpha,\beta$-ethylenically unsaturated carboxylic acid. The blends demonstrate improved processability and impact strength.

23 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYKETONE POLYMER BLENDS

FIELD OF THE INVENTION

This invention relates to an improved polymer blend comprising a linear alternating polymer of carbon monoxide and at least one ethylenically unsaturated hydrocarbon. More particularly, the invention relates to a blend of (1) the linear alternating polymer, (2) a polyblend with a rubber modifier incorporated therein, and optionally, (3) an acidic polymer containing moieties of an α-olefin and an α,β-ethylenically unsaturated carboxylic acid.

BACKGROUND OF THE INVENTION

The class of polymers of carbon monoxide and olefins has been known for some time. U.S. Pat. No. 2,495,286 (Brubaker) discloses polymers of relatively low carbon monoxide content in the presence of free radical initiators, e.g., peroxy compounds. G.B. 1,081,304 discloses similar polymers of higher carbon monoxide content produced in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles such as containers for food and drink and parts for the automotive industry which are produced by processing the polyketone polymer according to well known methods. For some particular applications however, it has been found to be desirable to have properties which are somewhat different from those of the polyketone polymer. It would be of advantage to retain the more desirable properties of the polyketone polymer and yet improve other properties. These advantages are often realized through the provision of a polymer blend.

SUMMARY OF THE INVENTION

The present invention provides blends of a linear alternating polymer of carbon monoxide and at least one ethylenically unsaturated hydrocarbon with certain other polymeric materials. More particularly, the invention provides blends of (1) the linear alternating polymer with (2) a polyblend comprising a rubber substrate polymer and a superstrate polymer grafted thereon which comprises a monoalkenyl aromatic monomer and an unsaturated dicarboxylic acid anhydride, and, optionally, (3) an acidic polymer containing moieties of an α-olefin and an α,β-ethylenically unsaturated carboxylic acid, optionally containing a third polymerizable monomer and wherein, optionally, a portion of the carboxylic acid groups are neutralized with non-alkali metal. The blends of the invention exhibit improved processability and impact strength.

DESCRIPTION OF THE INVENTION

The polyketone polymers of the blends of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula $$\left[CO\left[CH_2-CH_2\right]\right]_x\left[CO\left[G\right]\right]_y$$

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the $-CO\left[CH_2CH_2\right]-$ units and the $-CO\left[G\right]-$ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of and the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144. The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atomosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

A second component of the blends of the invention is a polyblend comprising a rubber substrate polymer and a superstrate polymer grafted thereon which comprises a monoalkenyl aromatic monomer and an unsaturated dicarboxylic acid anhydride. The rubber substrate polymer has a glass transition temperature (Tg) below 0° C., and comprises from about 2 wt % to about 30 wt % of the polyblend. The superstrate polymer grafted thereon comprises from about 65 wt % to about 85 wt % of a monoalkenyl aromatic monomer and from about 15 to about 35 wt % of an unsaturated dicarboxylic acid anhydride. Preferably, the polyblend is a styrene/maleic anhydride (SMA) copolymer having a rubber modifier incorporated therein.

More specifically, the polyblends of the invention comprise:

(A) a rubber substrate polymer having a glass transition temperature below 0° C., the amount of the rubber substrate being from about 2 wt % to about 30 wt % of the polyblend, and (B) a superstrate polymer grafted onto the rubber substrate which comprises from about 65 wt % to about 85 wt % of a monoalkenyl aromatic monomer and from about 15 wt % to about 35 wt % of an unsaturated dicarboxylic acid anhydride.

Optionally, the superstrate polymer of the polyblend may also contain an additional monomer that is copolymerizable with the other monomers in the superstrate polymer and in the presence of the rubber substrate to form a matrix polymer without grafting to the rubber substrate.

The rubber substrate component of the polyblend can be selected from a wide range of alternatives including butadiene polymers and copolymers, polyisoprene, polychloroprene, polyacrylate rubbers, and ethylene/propylene/diene rubber (EPDM), polypentenamer and ethylene/vinyl acetate rubbers, and copolyester elastomers with alternating hard and soft segments. Copolymers of cyclopentane with a minor proportion of a non-cyclic α-olefin such as, for example, a copolymer of 55 to 95 wt % of cyclopentane with from 5 to 45 wt % of ethylene are particularly useful. Other rubbers which have a Tg below 0° C. and which may be grafted with the monomers used to produce the polyblend can be used. The preferred rubbers include polybutadiene and copolymers of butadiene with up to about 40 wt % of a styrene, acrylonitrile, or styrene/acrylonitrile comonomer. The most preferred rubber is an acrylonitrile/butadiene/styrene (ABS) rubber intermediate.

The monoalkenyl aromatic monomer used in the polyblend is preferably styrene, but styrene derivatives such as chlorostyrene, vinyl toluene, α-methyl styrene, α-methyl vinyl toluene, 2,4-dichlorostyrene and 2-chloro-4-methylstyrene may be substituted for styrene in whole or in part if desired.

The unsaturated dicarboxylic acid anhydride used in the polyblend is most preferably maleic anhydride though any of the homologs of maleic anhydride such as itaconic, citraconic and aconitric anhydrides can also be used.

The superstrate polymer grafted onto the rubber substrate is preferably a styrene/maleic anhydride (SMA) copolymer. The superstrate polymer of the polyblend can optionally contain up to about 30 wt % of an additional monomer that is copolymerizable with the other monomers in the presence of the rubber substrate to form a matrix polymer. During graft polymerization of the superstrate polymer onto the rubber substrate, some portions of the monomers polymerize together to form the matrix polymer, without grafting onto the substrate. The presence of such matrix polymer is also contemplated in this invention. It is not necessary that all the matrix polymer be formed during the grafting process. Further matrix polymer may be added subsequently to obtain the desired formulation.

The selection of this copolymerizable monomer may be influenced by factors such as the ease with which the copolymerization takes place, the compatibility of the monomers, phase differences and the like. Copolymerizable monomers can be identified among monomers such as olefins, aliphatic or aromatic esters of unsaturated acids, unsaturated ethers, unsaturated nitriles, vinyl halides, vinyl esters and the like.

In practice, a preferred group of copolymerizable monomers includes $C_4$ to $C_6$ α-olefins, $C_1$ to $C_3$ alkyl esters of (meth)acrylic acid, methacrylontrile and acrylonitrile. Where the copolymerizable monomer is an olefin it can be, for example, cyclohexene, n-hexene, isopentane, n-pentene, n-butene or isobutylene. The acrylate ester can be methyl acrylate, ethyl acrylate or propyl acrylate; the methacrylate esters, which are generally preferred over the acrylate esters, are methyl methacrylate, ethyl methacrylate or propyl methacrylate. The preferred copolymerizable monomers are isobutylene, methyl methacrylate, and acrylonitrile.

To form the polyblend, the monoalkenyl aromatic monomer and unsaturated dicarboxylic acid anhydride are polymerized together in the presence of the rubber and in the absence of the copolymerizable monomer. The polyblend is conveniently prepared by dissolving the rubber in solution of the monoalkenyl aromatic component, and then polymerizing the solution with the anhydride component.

Where a copolymerizable monomer is present, a polymerization schedule may be devised on the basis of the relative reactivities of the monomers. Typical schedules involve preparing an initial reaction mixture comprising a solvent, the bulk of the alkenyl aromatic monomers, a very small amount (or none) of the anhydride monomer and the major proportion of the termonomer. The rubber is dissolved in this mixture and the balance of the monomers is added slowly during the polymerization.

The amount of rubber substrate (on an ungrafted basis) in the polyblend is in the range of from about 2 wt % to about 30 wt %, based on the total weight of the polyblend, including any matrix polymer present. Preferably, however, the rubber substrate represents from about 10 wt % to about 30 wt % of the total weight of the polyblend.

The superstrate polymer in the polyblend contains in the range of from about 65 wt % to about 85 wt % of a monoalkenyl aromatic monomer and from about 15 wt % to about 35 wt % of an unsaturated dicarboxylic acid anhydride. The superstrate polymer preferably contains from about 70 wt % to about 80 wt % of the monoalkenyl aromatic monomer and from about 20 wt % to about 30 wt % of the unsaturated dicarboxylic acid anhydride. Where an optional copolymerizable monomer is present, the specific amounts of monoalkenyl aromatic monomer and unsaturated dicarboxylic acid anhydride may depend on the type of optional copolymerizable monomer present.

The precise percentage of the polyblend to be employed in the blends of the invention is not critical. Compositions containing from less than about 1 wt % up to about 20 wt %, based on total blend composition, of the polyblend component are believed to be satisfactory, with from less than about 1 wt % to about 10 wt % being preferred, and from less than about 1 wt % to about 5 wt % being most preferred.

The polymeric compositions of the blends of the type described in U.S. Pat. No. 4,197,376, incorporated herein by reference, are particularly useful in the subject invention. Polymers prepared by compounding an SMA copolymer with ABS rubber intermediates, available from the Monsanto Company under the trademark CADON® are useful in the subject invention. CADON 127 and CADON 160 are particularly useful in the subject invention.

The optional, third polymeric component of the blends of the invention, present as a minor component if present at all, is an acidic polymer containing moieties of an α-olefin and an α,β-ethylenically unsaturated carboxylic acid, optionally polymerized with a third monomer and optionally having a portion of the carboxylic acid groups neutralized with non-alkali metal. The α-olefin monomer of this optional blend component is an α-olefin of up to 10 carbon atoms inclusive such as ethylene, propylene, 1-butene, isobutylene, 1-octene and 1-decane. Preferred α-olefins are straight chain α-olefins of up to 4 carbon atoms inclusive and most preferred is ethylene. The α-olefin monomer of this optional blend component is present in at least 65 mol % based on total component and is preferably present in at least 80 mol % on the same basis.

The ethylenically unsaturated carboxylic acid monomer is an α,β-ethylenically unsaturated carboxylic acid of up to 10 carbon atoms inclusive and is illustrated by acrylic acid, 2-hexenoic acid and 2-octenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated acid monomer of the optional fourth polymeric blend component is present in an amount from about 1 wt % to about 35 wt % based on total blend component, but amounts from about 5 mol % to about 20 mole % on the same basis are preferred.

The acidic polymeric optional blend component is suitably a copolymer of the α-olefin and the unsaturated carboxylic acid and in general such copolymers are preferred. On occasion, however, it is useful to incorporate as an optional third monomer a non-acidic, low molecular weight polymerizable monomer of up to 8 carbon atoms inclusive. Such optional monomer may be another α-olefin such as propylene or styrene when the major α-olefin monomer is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated, the presence of this third monomer is optional and is not required. Amounts of the third monomer up to about 5 mol %, based on total optional blend component polymer are satisfactory with amounts up to about 3 mol % on the same basis being preferred.

Independent of whether the polymer of the optional third blend component is a copolymer or a terpolymer, in an optional embodiment of the third polymeric blend component a portion of the carboxylic acid groups is neutralized with non-alkali metal. When partially neutralized, this optional blend component is polymeric in form while exhibiting ionic character and is conventionally referred to as a metal ionomer. In the partially neutralized embodiment of the optional polymeric blend component the α-olefin/unsaturated carboxylic acid polymer, with or without the optional third monomer, is reacted with a source of ionizable zinc, aluminum or magnesium compound sufficient to neutralize from about 10% to about 90%, preferably from about 20% to about 80%, of the carboxylic acid groups present in the polymer. Such neutralization, particularly with zinc, the preferred metal, results in a uniform distribution of metal throughout the polymer. The ionizable metal compound utilized in the neutralization is a source of complexed or uncomplexed non-alkali metal ions including zinc, aluminum or magnesium ions which are provided in compounds of the type known as metal salts, e.g., uncomplexed metal ion salts such as zinc acetate, zinc chloride or zinc formate, or complexed metal ion salts in which the metal is bonded to two types of groups, at least one of which is readily ionizable and the other is not. Illustrative of such complexed metal ion salts are mixed zinc salts with one weak acid such as oleic acid or stearic acid and one more ionizable acid such as acetic acid or formic acid. In general, neutralization with a complexed non-alkali metal ion is preferred.

The optionally partially neutralized polymers employed as the optional polymeric blend component are broadly conventional and many are commercial. Copolymers of ethylene and methacrylic acid are marketed by DuPont under the trademark NUCREL®. Copolymers of ethylene and acrylic acid are marketed by Dow under the trademark PRIMACORE®, which is particularly useful in the blends of the invention. Partially neutralized polymers are marketed by DuPont under the trademark SURLYN®. The amount of the optional third component will suitably be up to about 10 wt % based on the total polymer blend. Amounts of the optional blend component up to about 5 wt % on the same basis are preferred.

The blends of the invention may also include conventional additives such as antioxidants and stabilizers, fillers and fire resistant materials, mold release agents, colorants and other materials designed to improve the processability of the polymers or the properties of the resulting blend. Such additives are added by conventional methods prior to, together with or subsequent to the blending of the polyketone and the toughened blend.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear, such as a Banbury or Brabender. Some components of the blends of the invention may be blended together prior to blending with other ingredients. For example, components A and B of the polyblend component may be blended together to form the polyblend, which is then subsequently blended with the other components of the blends of the invention. Conventional additives may be included at any step of the preparation process for the blends of the invention. The blends are processed by conventional methods such as extrusion and injection molding into sheets, films, plates and shaped parts. Illustrative of such applications are the production of internal and external parts for automotive use.

The invention is further illustrated by the following Examples which should not be regarded as limiting.

EXAMPLE 1

A linear alternating terpolymer of carbon monoxide, ethylene, and propylene was produced in the presence of a catalyst composition formed from palladium acetate, trifluoroacetic acid and 1,3-bis[di(2-methoxyphenyl)phosphino]propane. The polyketone polymer had a melting point of about 225° C. and a limiting viscosity number (LVN) of about 1.7 dl/g when measured in m-cresol at 60° C. The polyketone polymer also contained 0.45% Irganox MD-1024, 0.45% Irganox 245, 0.5% Naugard 445, and 0.1% Ecruamide.

EXAMPLE 2

Blends were prepared of a polyketone terpolymer of Example 1 and three polymers prepared by compounding an SMA copolymer with ABS rubber intermediates, CADON 127, CADON 140 and CADON 160, each at 1 to 20 wt %, as shown in Table 1. The blends were compounded on a 30 mm corotating twin screw extruder, operating at about 300 RPM with melt temperatures between 230° and 250° C. Subsequent to blending, specimens of the blends were injection molded on a 25 ton Arburg molding machine. Blends of CADON 127 and CADON 160 at 20 wt % did not produce continuous strands during processing, and exhibited instabilities during molding. Molded specimens were stored over desiccant until tested. Mechanical testing was performed on "dry as molded" specimens.

TABLE 1

| | | Impact and Tensile Properties | | | | |
|---|---|---|---|---|---|---|
| | Composition | Notched Izod | Gardner | Tensile Strength | | |
| CADON Type | (Polyketone/ CADON) | (ft-lb/in) Room Temp. | (in-lb) Room Temp. | Yield (PSI) | Break (PSI) | Elongation % |
| — | 100/0 | 4.90 | 100 | 9600 | 8600 | 37 |
| 127 | 99/1 | 4.75 | >320 | 9400 | 9400 | 18 |
| 127 | 95/5 | 4.71 | 240 | 9500 | 9200 | 34 |
| 127 | 90/10 | 4.49 | 90 | 9400 | 9200 | 87 |
| 140 | 99/1 | — | 240 | 9300 | 8400 | 46 |
| 140 | 95/5 | — | 130 | 9100 | 8000 | 41 |
| 140 | 90/10 | — | 160 | 9500 | 8800 | 109 |
| 140 | 80/20 | — | 16 | 9000 | 8900 | 14 |
| 160 | 99/1 | — | >320 | 9400 | 8500 | 52 |
| 160 | 95/5 | — | 264 | 9300 | 8300 | 40 |
| 160 | 90/10 | — | 200 | 9200 | 8700 | 63 |

Impact and tensile properties of the samples are shown in Table 1. Optimum Gardner impact values were obtained at lower CADON concentrations, while tensile properties remained relatively constant over the range studied. The improved impact strength, obtained without any detrimental effect on tensile properties, indicates that CADON 127 and CADON 160 are effective tougheners for the polyketone polymer, particularly at low concentrations.

EXAMPLE 3

Blends were prepared of a polyketone terpolymer of Example 1 and three different grades of CADON, as in Example 2. Each blend also contained 1% PRIMACORE 1410 as a melt processing aid. The blends prepared are shown in Table 2. The blends were compounded on an extruder operating at about 300 RPM with melt temperatures between 230° and 250° C. Subsequent to blending, specimens of the blends were injection molded on a 25 ton Arburg molding machine. Molded specimens were stored over desiccant until tested. Mechanical testing was performed on "dry as molded" specimens.

TABLE 2

| | | Impact and Tensile Properties | | | | |
|---|---|---|---|---|---|---|
| | Composition | Notched Izod | Gardner | Tensile Strength | | |
| CADON Type | (Polyketone/ CADON) | (ft-lb/in) Room Temp. | (in-lb) Room Temp. | Yield (PSI) | Break (PSI) | Elongation % |
| — | 100/0 | 4.90 | 100 | 9600 | 8600 | 37 |
| 127 | 99/1 | 4.93 | >320 | 9200 | 8100 | 58 |
| 127 | 95/5 | 5.00 | 300 | 9000 | 8200 | 57 |
| 127 | 90/10 | 4.24 | 300 | 8800 | 8400 | 61 |
| 127 | 80/20 | 3.87 | 125 | 8500 | 8300 | 73 |
| 140 | 99/1 | — | — | 9000 | 7500 | 68 |
| 140 | 95/5 | — | — | 9000 | 7700 | 53 |
| 140 | 90/10 | — | — | 8800 | 7600 | 91 |
| 140 | 80/20 | — | — | 8400 | 7900 | 31 |
| 160 | 99/1 | — | >320 | 9100 | 7900 | 31 |
| 160 | 95/5 | — | >320 | 9100 | 8000 | 42 |
| 160 | 90/10 | — | 175 | 9200 | 8500 | 48 |
| 160 | 80/20 | — | 70 | 8800 | 8200 | 70 |

Impact and tensile properties of the samples are shown in Table 2. Use of PRIMACORE 1410 as a melt processing acid allowed compounding of 20 wt % samples of all three CADON grades. The PRIMACORE 1410 also improved impact resistance, particularly at CADON concentrations above 1 wt %. CADON modifiers improved the Gardner Impact resistance of the polyketone polymer without sacrifice of tensile properties, and increased the elongation to break in most cases.

What is claimed is:

1. A composition comprising a blend of:

(1) a linear alternating polymer of carbon monoxide and at least one ethylenically unsaturated hydrocarbon, wherein the linear alternating polymer is represented by the repeating formula $$\left[CO\left(CH_2-CH_2\right)\right]_x\left[CO\left(G\right)\right]_y$$

wherein G is a moiety of an ethylenically unsaturated hydrocarbon of at least 3 carbon atoms polymerized through the ethylenic unsaturation and the ratio of y:x is no more than about 0.5;

(2) a polyblend, present in an amount of from about 1 wt % to about 20 wt %, based on total blend composition, comprising:

(A) a rubber substrate polymer present in an amount of from about 10 wt % to about 30 wt % of the total polyblend, and selected from the group consisting of polybutadiene and copolymers of butadiene with up to about 40 wt % of styrene, acrylonitrile, or styrene/acrylonitrile comonomer; and (B) a superstrate polymer grafted onto the rubber substrate which comprises from about 70 wt % to about 80 wt % of styrene and from about 20 wt % to about 30 wt % of maleic anhydride; and, optionally, (3) an acidic polymer present in an amount of up to about 10 wt % of the total blend, and comprising a non-neutralized copolymer of ethylene and acrylic acid or methacrylic acid.

2. The composition of claim 1 wherein the polyblend comprises from about 1 wt % to about 10 wt % of the total blend.

3. The composition of claim 1 wherein the polyblend comprises from about 1 wt % to about 5 wt % of the total blend.

4. A composition comprising a blend of:

(1) a linear alternating polymer of carbon monoxide and at least one ethylenically unsaturated hydrocarbon, wherein the linear alternating polymer is represented by the repeating formula $$\left[CO\left(CH_2-CH_2\right)\right]_x\left[CO\left(G\right)\right]_y$$

wherein G is a moiety of an ethylenically unsaturated hydrocarbon of at least 3 carbon atoms polymerized through the ethylenic unsaturation and the ratio of y:x is no more than about 0.5;

(2) a polyblend, present in an amount of from about 1 wt % to about 20 wt %, based on total blend composition, comprising:

(A) a rubber substrate polymer, wherein the amount of the rubber substrate is from about 2 wt % to about 30 wt %, of the total polyblend; and (B) a superstrate polymer grafted onto the rubber substrate which comprises from about 40 wt % to about 85 wt % of a monoalkenyl aromatic monomer and from about 15 wt % to about 35 wt % of an unsaturated dicarboxylic acid anhydride; and, optionally, (3) an acidic polymer incorporating moieties of α-olefin, α,β-ethylenically unsaturated carboxylic acid, and optionally, a non-acidic, low molecular weight polymerizable monomer, the acidic polymer optionally having a portion of the carboxylic acid groups neutralized with non-alkali metal.

5. The composition of claim 4 wherein the amount of the rubber substrate comprises from about 10 wt % to about 30 wt % of the total weight of the polyblend.

6. The composition of claim 5 wherein the superstrate polymer comprises from about 70 wt % to about 80 wt % of a monalkenyl aromatic monomer and from about 20 wt % to about 30 wt % of an unsaturated dicarboxylic acid anhydride.

7. The composition of claim 6 wherein, in the linear alternating polymer, y is zero.

8. The composition of claim 7 wherein the rubber substrate component of the polyblend is selected from the group consisting of polybutadiene and copolymers of butadiene with up to about 40 wt % of a styrene, acrylonitrile, or styrene/acrylonitrile comonomer.

9. The composition of claim 8 wherein the monoalkenyl aromatic monomer of the superstrate polymer is styrene.

10. The composition of claim 9 wherein the unsaturated dicarboxylic acid anhydride is maleic anhydride.

11. The composition of claim 10 wherein the polyblend comprises from less than about 1 wt % to about 10 wt % of the total blend.

12. The composition of claim 11 wherein the superstrate polymer is a styrene/maleic anhydride copolymer.

13. The composition of claim 12 wherein the rubber substrate component of the polyblend is an acrylonitrile/butadiene/styrene rubber intermediate.

14. The composition of claim 13 wherein the polyblend comprises from less than about 1 wt % to about 5 wt % of the total blend.

15. The composition of claim 14 wherein the polyblend is a styrene/maleic anhydride copolymer with an acrylonitrile/butadiene/styrene rubber intermediate incorporated therein.

16. The composition of claim 15 wherein the acidic polymer is present in an amount of up to about 10 wt % of the total blend, and the acidic polymer comprises a non-neutralized copolymer of ethylene and acrylic acid or methacrylic acid.

17. The composition of claim 15 wherein the acidic polymer is present in an amount of up to about 10 wt % of the total blend, and the acidic polymer has from about 10% to about 90% of the carboxylic acid groups neutralized with zinc, aluminum or magnesium.

18. The composition of claim 6 wherein, in the linear alternating polymer, G is a moiety of propylene and the ratio of y:x is from about 0.01 to about 0.1.

19. The composition of claim 15 wherein the polyblend additionally includes a matrix polymer.

20. The composition of claim 19 wherein during the graft polymerization of the superstrate polymer onto the rubber substrate, a copolymerizable monomer is also included, such that the matrix polymer forms, without grafting onto the substrate.

21. The composition of claim 20 wherein the copolymerizable monomer is selected from the group consisting of isobutylene, methyl methacrylate, and acrylonitrile.

22. The composition of claim 21 wherein the acidic polymer is present in an amount of up to about 10 wt % of the total blend, and the acidic polymer comprises a non-neutralized copolymer of ethylene and acrylic acid or methacrylic acid.

23. The composition of claim 21 wherein the acidic polymer is present in an amount of up to about 10 wt % of the total blend, and the acidic polymer has from about 10% to about 90% of the carboxylic acid groups neutralized with zinc, aluminum or magnesium.

* * * * *